United States Patent [19]

Alexander et al.

[11] Patent Number: 5,589,603
[45] Date of Patent: Dec. 31, 1996

[54] METHOD AND APPARATUS FOR THE INJECTION DISPOSAL OF SOLID AND LIQUID WASTE MATERIALS FROM THE DRILLING AND PRODUCTION OF OIL AND GAS WELLS

[75] Inventors: Albert H. D. Alexander, Laurel, Miss.; W. Thomas Ballatine, Mandeville, La.; Leland D. Lakey, Sandeville, La.; Frank L. Lyon, Mandeville, La.

[73] Assignee: Newpark Resources, Inc., Metairie, La.

[21] Appl. No.: 294,250

[22] Filed: Aug. 22, 1994

[51] Int. Cl.$^6$ .................................................... A62D 3/00
[52] U.S. Cl. ........................... 588/250; 175/66; 175/206; 166/305.1; 405/128
[58] Field of Search ................................... 405/128, 266; 588/250; 175/206, 66; 166/305.1, 305 D

[56] References Cited

U.S. PATENT DOCUMENTS

| | | |
|---|---|---|
| 4,482,459 | 11/1984 | Shiver . |
| 4,942,929 | 7/1990 | Malachosky et al. ............... 405/128 X |
| 5,108,226 | 4/1992 | Jennings .................................... 405/128 |
| 5,129,469 | 7/1992 | Jackson ................................ 405/128 X |
| 5,133,624 | 7/1992 | Cahill ........................................ 405/128 |
| 5,191,157 | 3/1993 | Crocker .............................. 588/250 X |
| 5,226,749 | 7/1993 | Perkins ..................................... 405/128 |
| 5,310,282 | 5/1994 | Voskamp ................................... 405/58 |
| 5,310,285 | 5/1994 | Northcott ................................. 405/128 |
| 5,314,265 | 5/1994 | Perkins et al. ...................... 588/250 X |
| 5,405,223 | 4/1995 | Sirevag .................................... 405/128 |
| 5,405,224 | 4/1995 | Aubert et al. ........................... 405/128 |

FOREIGN PATENT DOCUMENTS

| | | |
|---|---|---|
| 2239471 | 7/1991 | United Kingdom . |

OTHER PUBLICATIONS

10 Reasons Why Newpark Environmental Services is the Oilfield's Best Choice for Disposal of Nonhazardous Oilfield Waste, Newpark Environmental Services, Inc.

Drilling Waste Into Product Cycle, Newpark Environmental Services, Inc.
Waste Minimization in the Oilfield, Tech. Bulletin #12, May 1993.
Naturally Occurring Radioactive Material: The Newest Challenge in Oilfield Waste Regulations, Tech. Bulletin #13, Jul. 1993.
Environmental Sampling: Solid Waste Regulatory Requirements, Tech. Bulletin #16, May 1994.
Environmental Sampling: Solid Waste Devices and Containers, Tech. Bulletin #17, Jun. 1994.
Environmental Sampling: The Plan, Tech. Bulletin #5, Apr. 1992.
From Waste to a Product Through Processing & Reuse, Tech. Bulletin #7, Sep. 1992.
The Removal of Liability Through Recycling, Tech. Bulletin #8, Decl. 1992.
The Holistic Approach, Oil & Gas Investor, Oct. 1992.

(List continued on next page.)

*Primary Examiner*—Dennis L. Taylor
*Attorney, Agent, or Firm*—Gunn & Associates, P. C.

[57] ABSTRACT

Methods and apparatus for the disposal of solid particulate material in subterranean formations are disclosed. The invention is not limited to the disposal of oil field waste and therefore provides means and methods for the disposal of virtually any type of waste slurry stream. A slurry is formed at the surface of the earth by mixing the solid waste in particulate form with liquid and viscosifier thereby forming a slurry. A borehole is drilled into a selected injection formation and the slurry is pumped from the surface through the borehole and into the injection formation. Some surface pretreating of the slurry may be required including sizing of the particulate solids, adding weighting material, removing excessive amounts of oil and grease and diluting to reduce the level of radioactivity. The injection formation is preferably dipping in angle with respect to the horizontal and highly fractured. The borehole is hydraulically isolated from intervening earth strata between the surface of the earth and the injection formation.

35 Claims, 2 Drawing Sheets

OTHER PUBLICATIONS

Classification of Nonhazardous Oilfield Waste, Mar. 1991.

Barium Testing: Acid Digestion Procedure vs. True Total Barium Method, Tech. Bulletin #4, Nov. 1991.

New Processing & Service Facility, Port Arthur.

Statement of Environmental Policy.

Newpark Environmental Services, Inc. "Oilfield".

Newpark Environmental Services, Inc. "Laboratory & Consulting Services".

Newpark Industrial Services, Inc., "Industrial".

Regulatory Requirements.

Permeability: Its Relationship to Minimizing Liability, Tech. Bulletin #9, Jan. 1993.

Environmental Sampling: Equipment, Containers & Preservatives, Tech. Bulletin #10, Jan. 1993.

Environmental Sampling: Louisiana Statewide Order 29–B Regulations, Tech. Bulletin #11, Jan. 1993.

Barium in Nonhazardous Oilfield Waste: When it is an Environmental Threat?, Tech. Bulletin #3, Oct. 1991.

Oil & Grease, Salts, & Heavy Metals: Environmental Problems & Solutions, Tech. Bulletin #2, May 1991.

Environmental Sampling: Basic Statistics of Probability Sampling, Tech. Bulletin #6, May 1992.

Naturally Occurring Radioactive Material: Surveying, Disposal, Release, and State Regulations, Tech. Bulletin #15, Dec. 1992.

Environmental Safety Criteria for the Use of Injection Wells, Tech. Bulletin #14, Nov. 1993.

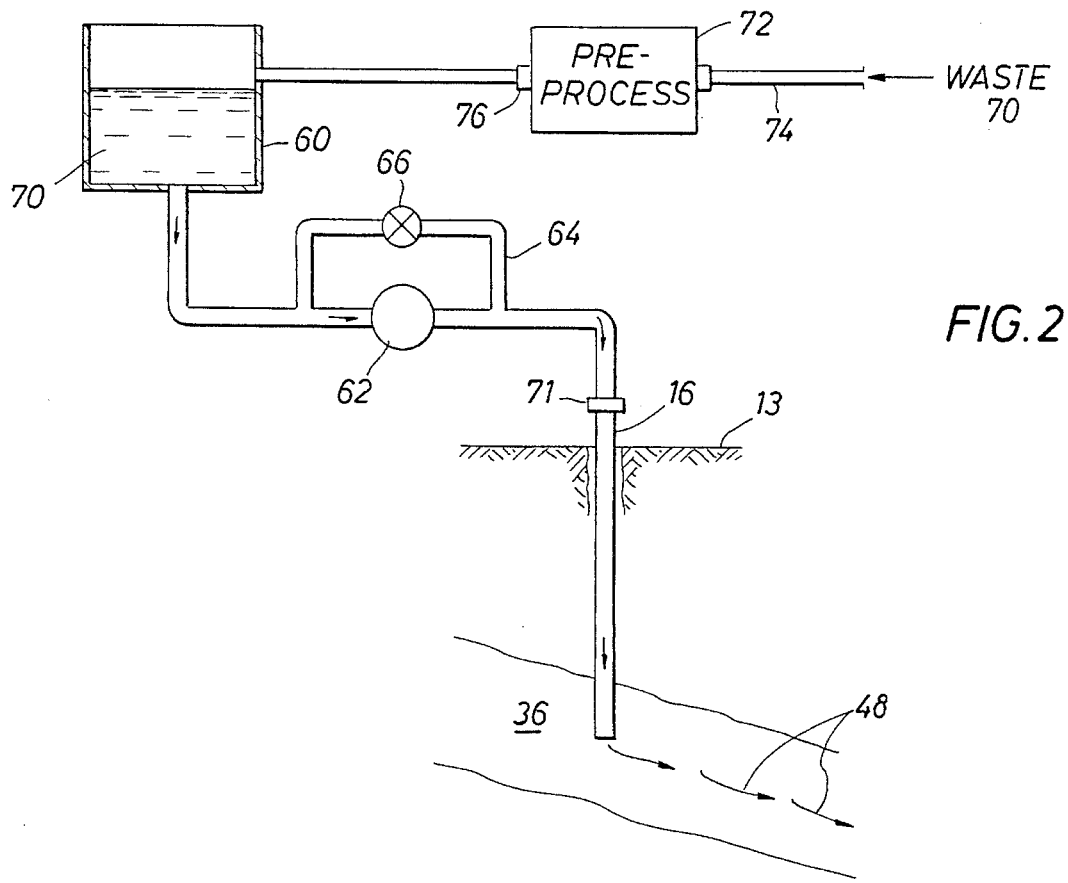
FIG. 2
FIG. 3
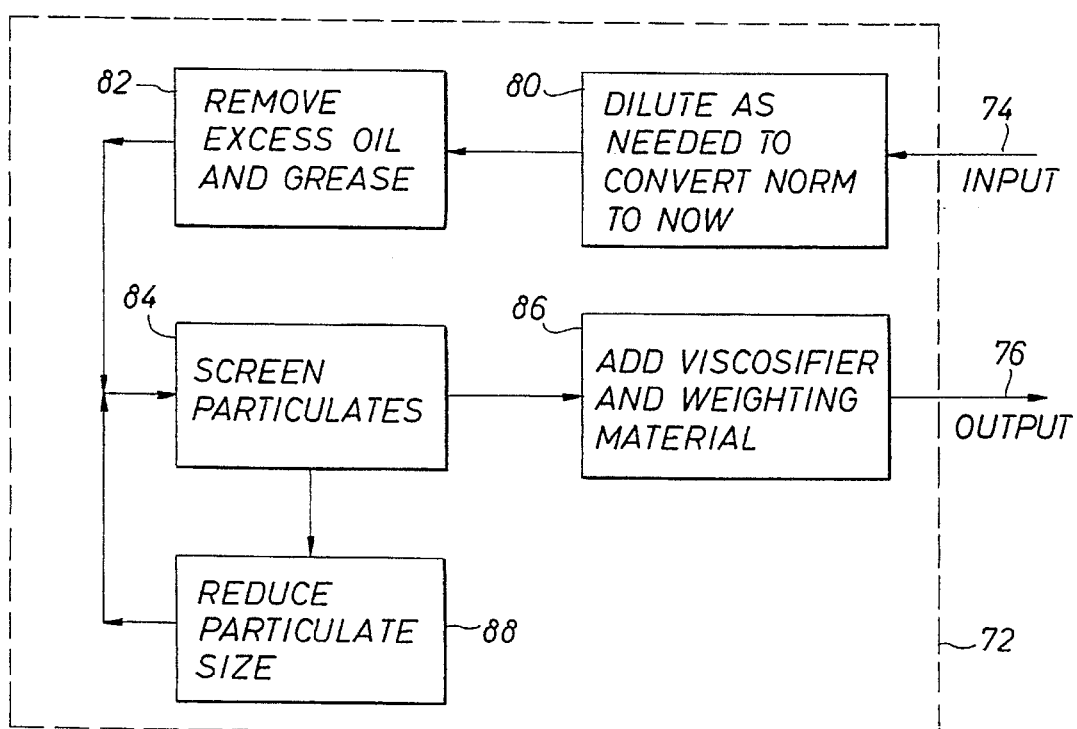

METHOD AND APPARATUS FOR THE INJECTION DISPOSAL OF SOLID AND LIQUID WASTE MATERIALS FROM THE DRILLING AND PRODUCTION OF OIL AND GAS WELLS

BACKGROUND OF THE INVENTION

The process used in the drilling of most oil and gas wells involves the use of a drilling fluid commonly referred to as drilling "mud" in the industry. The mud is injected under pressure through the drill string during drilling and returns to the surface through the drill string-borehole annulus. The mud performs multiple functions which include cooling of the drill bit, lubrication of the drill bit, providing a means of returning the drill cuttings to the surface of the earth and providing hydrostatic pressure to prevent the "blowout" of high pressure geologic zones when such zones are penetrated by the drill bit. Drilling mud comprises a liquid phase and a suspended solid phase. The liquid phase can be either fresh or saline water or even an oil base. The solid phase, which is suspended within the liquid phase, can comprise a multitude of materials blended to meet the particular needs at hand. As an example, barite (barium sulfate), with a specific gravity over 4.0, is often used as a weighting constituent to increase the bulk density of the mud when high pressure formations are being penetrated. Other additives are used to control drilling fluid circulation loss when certain types of high porosity, low pressure formations are penetrated. Once returned to the surface, the drilling fluid contains cuttings from the drill bit. Although most large cuttings are removed at the surface prior to recirculating the mud, smaller sized particles remain suspended within the drilling mud. Upon completion of the drilling operation, the drilling mud can sometimes be reconditioned and used again. Eventually, however, the mud can no longer be reprocessed and becomes classified as a waste product of the drilling operation.

Once the well has been successfully drilled and cased, hydrocarbons are extracted or produced from one or more formations penetrated by the borehole. Although hydrocarbons are the primary production fluids of interest, other non hazardous oilfield waste (NOW) is usually generated in the production of hydrocarbons. A water component is usually produced along with the hydrocarbon component, and in most areas of the world, the produced waters are saline. Although there are some secondary uses for produced waters, these waters are in general considered a waste product of the production operation. Solid wastes including sand, paraffin, sludges and other solid materials are also generated during the production operations. Large quantities of these solid wastes have been accumulated for decades in production pits. Environmental regulations have led to the need for disposal solutions for the materials contained in production pits undergoing remediation to acceptable environmental levels.

The isotopes uranium-238 and thorium-232, and the radioactive isotopes associated with the decay series of these isotopes, occur in nature in earth formations. In situ, the activities associated with these decay chains are relatively low and do not present a radiation hazard during the drilling operation. During well production, however, these naturally occurring radioactive materials (NORM) are dissolved in the produced waters and are transported to the surface. Over an extended period of time, the NORM becomes concentrated in precipitated scale associated with tubulars and surface equipment such as heater treaters, wellheads, separators and salt water tanks. Although the parent isotopes uranium-238 and thorium-232 are not generally present, the decay products or "daughter" products radium-226, radium-228, radon-222 and lead-210 can be found in oilfield waste. Radium-226, which coprecipitates with carbonates and sulfates of calcium, barium and strontium, is by far the greatest source of radioactive waste resulting from production activities. Once atoms of radium have replaced a sufficient number of atoms of the elements normally found in NOW waste to exceed a specified regulatory level, the waste is classified as NORM. Stated another way, there is no difference between NOW and NORM waste other than the level of radioactivity, which usually results from the radium content of NORM waste.

In summary, the drilling and production of oil and gas wells generates much waste. The wastes are classified as nonhazardous oilfield waste (NOW) and naturally occurring radioactive materials (NORM). NOW originating from drilling and production operations is primarily composed of drill cuttings, sand and spent material such as drilling mud which is no longer suitable for use and must be managed as waste under regulatory authority. Such mud might contain salts, non toxic metals such as sodium and calcium, toxic metals such as barium, chromium, lead, zinc and cadmium, and oil and grease contamination from the introduction of diesel oil (oil based mud), crude oil or a multitude of hydrocarbon based additives. The spent mud, with associated contaminants, comprises a liquid and a solid phase. NOW is also generated in production operations where copious amounts of saline water, along with some solids (sand), may be produced with the desired hydrocarbons. NORM originates primarily from production operations wherein the previously described radioactive scale contaminates not only large pieces of hardware such as well heads and separators but also can contaminate produced "waste" fluids such as salt water and associated solids. It is necessary to dispose of all types of waste, including those previously stored in pits, in a manner which will not contaminate the surface of the earth and not contaminate subterranean aquifers used as sources of drinking water.

Various methods are used to dispose of both NORM and NOW material. Oil and grease toxicity in NOW can be lowered by dilution techniques. Organics can be converted biologically to less toxic forms. Organics can also be removed by extraction processes. These extraction processes can utilize heat and may include methods such as thermal desorption or incineration. Oils can be removed by separation techniques and possibly produce a byproduct of commercial value. Organics can also be bound to solids thereby reducing their leachability and hazard to drinking water supplies. Salts can be diluted and discharged, chemically destroyed or rendered insoluble. Heavy metals can neither be biologically or chemically changed into less toxic species, therefore dilution with non contaminated materials is one method of controlling possible hazardous pollution. Heavy metals can be bound chemically thereby rendering them immobile and nonleachable into the environment. NORM can not be destroyed or chemically altered, therefore dilution with essentially non radioactive material to prescribed levels is an acceptable method. Other possible methods of disposal and/or storage of NORM include near surface burial, deposition with or without encapsulation into the wellbore of plugged and abandoned wells, and injection into geological formations at high pressures which exceed the fracture pressure of the injection formation.

The previous paragraph addresses current practices in the disposal of waste material by type of classification. Another set of disposal criteria has been developed around the physical form of the waste, namely solid or liquid. It should be recalled that spent drilling fluid is in the form of a slurry comprising liquid and solid components. U.S. Pat. No. 4,482,459 (now expired) to Carolyn Shiver, and assigned to the assignee of the current disclosure, teaches a method for continuous processing of a slurry of waste drilling mud fluids and water normally resulting from drilling operations. The process comprises the steps of conducting the drilling mud slurry to a slurry tank for liquid-solid separation by chemical and physical means. The separated solid and liquid components are treated and processed such that they are converted to a state suitable for reuse or release into the environment. There are a number of references which address the separation of liquid and solid components, and the processing of these components to render them harmless to the environment. All of the techniques mentioned above for the disposal of NOW and NORM and the processing of waste slurries are relatively expensive, time consuming, and may involve extensive handling, packaging, transportation and special regulatory permits.

The means of injecting liquid waste back into earth formations by means of a disposal well has been used for many years and remains the predominant method of disposal in the oil and gas industry. An injection well must meet certain criteria. Among these criteria are defined geologic conditions surrounding the injection well, proper casing and cementing of wells penetrating the injection zone, a maximum allowable surface injection pressure (MASIP) and specific procedures for periodic testing and reporting to various regulating agencies. MASIP varies from state to state and even from location to location within a given state dependent upon formation depth, hydrostatic pressure, etc. Being regulatory, MASIP is certainly subject to change in the future. These measures, which are established to prevent possible migration of the waste liquid into underground sources of drinking water (USDW), will be detailed in subsequent sections of this disclosure. Current injection technology requires that the particle size of the solid phase of any slurry first be minimized before injection. This is to prevent clogging or "sanding" of the perforations opposite the injection zone and also to prevent the filling of pore space throats of the injection zone thereby reducing permeability. Processing time and cost must be incurred, and the large particle size solid component of the slurry must still be disposed of in an environmentally acceptable manner. The density of the injected liquid is usually relatively low, varying between 1.00 gm/cc (~8.34 lbs/gal) for fresh water to ~1.1 to 1.2 gm/cc for brines. Often a considerable amount of pump pressure is required to overcome the pressure of the geologic formation and thereby inject the liquid. Adequate pump capacity can comprise an appreciable percentage of the total injection operation cost. In addition, the MASIP is set so as not to damage the tubular strings and the cement sheaths of the injection well and to not damage the injection formation. In some states disposal wells have been drilled into cavities within salt domes or sulfur deposits. In those states cavities are created within salt domes for this purpose, and in the case of sulfur deposits, result from the leach method of production of sulfur. Both of these formations provide impermeable "containers" for liquids but, unfortunately, are not widely distributed geographically and sometimes require that waste be transported a great distance in order to be disposed of in this type of facility.

SUMMARY OF THE INVENTION

The present invention is directed toward methods and apparatus for the disposal of both solid and liquid constituents of oil field waste slurry by injection into subterranean formations which are naturally fractured and may be inclined from the horizontal plane or "dipping". The invention is not limited to the disposal of oil field waste and therefore provides means and methods for the disposal of virtually any type of waste slurry stream.

Some preparation of the slurry at the earth surface is usually necessary prior to injection. Preliminary screening of the solid particulate material is desirable if the slurry is thought to contain large particulates. As an example, large pieces of cuttings in spent drilling fluids are removed from the slurry, pumped through some type of grinding or shearing equipment, and returned to the slurry only after their size has been reduced so that they pass through the screen of predetermined size. Particulate material can be classified as NOW or NORM type. Processing leading to dilution may be required by regulations affecting the specific injection well. Viscosifiers are used to aid in the suspension of the particulate material in the slurry. The viscosifier can be a naturally occurring clay mineral such as virgin bentonite with a specific gravity of ~2.7. Montmorillonite is another suitable viscosifier. This type of viscosifier also adds weight to the slurry which assists in the injection process as will be described later. Virgin barite (barium sulfate) or other weighting material can also be used. Man made materials such as polymers can also be used as viscosifiers if the viscosifier is not requires to add additional weight to the slurry. In an alternate embodiment, products from surface recycling of NOW can also be used as a viscosifier, weighting agent, and diluent thereby recycling this NOW waste stream. Stated another way, byproduct generated by one waste processing method may be used as a key ingredient in a second waste disposal means.

Surface preprocessing can also be used on slurries containing relatively large concentrations of oil or grease. These components can be removed, or the concentrations reduced substantially, by using well known skimming and separation techniques. As mentioned previously, biodegrative agents and thermal methods can also be used to remove organic constituents such as oil and grease.

The selection of the zone or formation into which the slurry will be injected is of prime importance. The injection formation is preferably a limestone formation with high porosity and with a large fraction of the effective porosity being attributed to natural fractures. In addition, formation which have been partially depleted are also preferred. Commercial hydraulic fracturing methods can be used to induce fractures within the injection zone. The radial and vertical extent of induced fractures are usually rather limited thereby limiting the injection formation's capacity to receive injected material. The formation and associated fracture structure are preferably dipping with respect to the horizontal. Commercial acidizing techniques can also be used in carbonate injection formations thereby increasing the formation's receptivity to injected material. Current regulations specify that the injection formation must also be below any USDW and have an impermeable shale with a vertical thickness of at least 250 feet separating the injection formation from the USDW.

The injection well can be drilled specifically to the injection zone, or an existing well which penetrates a suitable injection formation can be modified to meet injection well standards. Current and proposed regulations require that the injection tubular of an injection well passing through an USDW be surrounded by two additional strings of casing, and that all tubular-borehole annuli be properly cemented for hydraulic isolation purposes. Tubulars are plugged at the lower vertical extent of the injection formation. The upper vertical extent of the injection formation is isolated by using a packer or other suitable means. Current practice is to first perforate only the lower portion of the injection zone. Should these perforations become plugged over the life of the injection operation, the injection formation can be perforated "up hole".

It has been determined that the slurry, processed and suspended with viscosifiers as outlined previously, flows into the selected injection formation with no clogging of the fractures or available pore space. This is because most of the effective porosity of the injection formation is in the form of fractures. The cross sectional areas of these fractures are normally orders of magnitude larger than the interstitial pore "throats" connecting effective pore space in non fractured consolidated or unconsolidated formations. The processed and suspended particulate material within the slurry can pass through the fractures without clogging. Since the injection formation is usually dipping from the horizontal and the injected slurry is weighted as previously discussed, flow is maintained with minimal pump pressure thereby reducing the costs of pumping and reducing the risk of damaging the hydraulic seals of the well and adversely affecting the injection formation. Experience has shown that with all other conditions being equal, the required injection pressure decreases as a function of the increasing dip of the injection zone and associated fracture system. Operational experience has also shown that for injection zones with sufficient dip combined with an appropriately weighted slurry, the slurry actually flows into the fractures due to the hydrostatic pressure head of the slurry column. Normal operation practice is, however, to maintain at least a nominal pump pressure for effective injection rates. The importance of low injection pressures are again emphasized in that pumping costs are reduced, the risk of damage to the well tubulars and cement sheaths are nil, and injection pressures are well below the fracture pressure of the injection formation.

In summary, methods and apparatus are presented for the disposal of waste slurry containing both liquids and solids by injecting this slurry into a subterranean formation through an injection well. The injection formation is selected to be a dipping, highly porous formation which is highly fractured thereby permitting the passage of the solid constituent of the slurry. Viscosifier is added to the slurry to (a) assist in suspending the solid particulate material and (b) add weight to the slurry thereby minimizing injection pumping requirements. Weighting material can also be added independently. If the slurry contains NORM, processing at the surface may be required to reduce the concentration of NORM to levels consistent with that permitted for the specific injection well being utilized. Processing may also be necessary to reduce the size of the particulates prior to injection. Furthermore, some preliminary skimming or separating at the surface of an abnormally high concentration of oil or grease may be required.

BRIEF DESCRIPTION OF THE DRAWINGS

So that the manner in which the above cited features, advantages and objects of the present invention are attained and can be understood in detail, a more particular description of the invention, briefly summarized above, may be had by reference to the embodiments thereof which are illustrated in the appended drawings. It is noted, however, that the appended drawings illustrate only typical embodiments of this invention and are therefore not to be considered limiting of its scope, for the invention may admit to other equally effective embodiments.

FIG. 2 is a schematic diagram of the surface apparatus and processes cooperating with an injection well which penetrates the injection formation; and FIG. 3 depicts in block diagram form the preprocessing steps for the injected slurry prior to injection.

DETAILED DESCRIPTION OF THE PREFERRED EMBODIMENT

Figure 1:
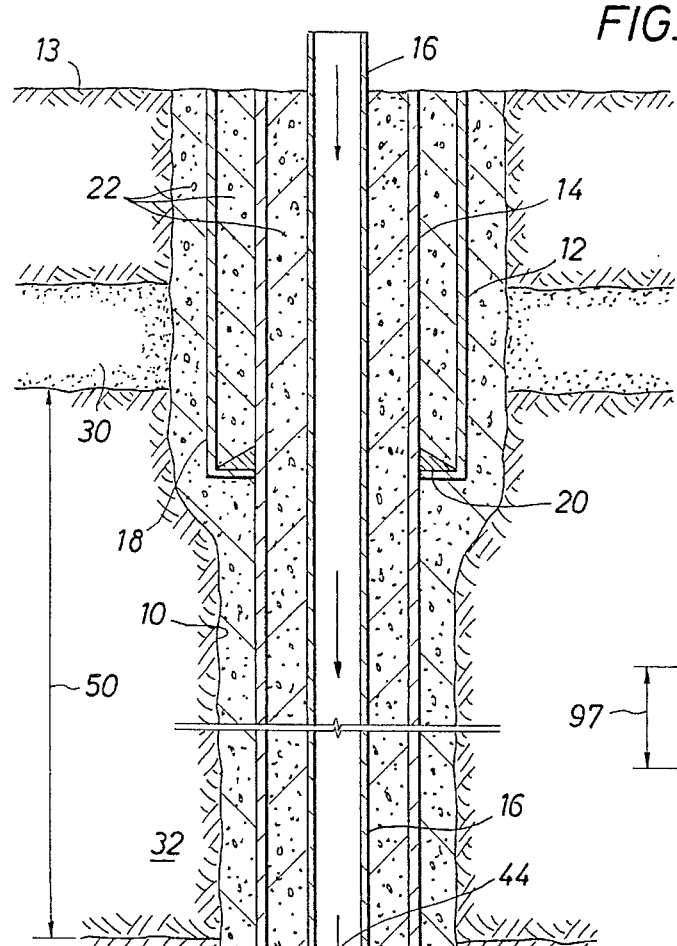
FIG. 1 illustrates a typical injection well which penetrates an USDW, an impermeable shale and the injection formation.
Figure 1:
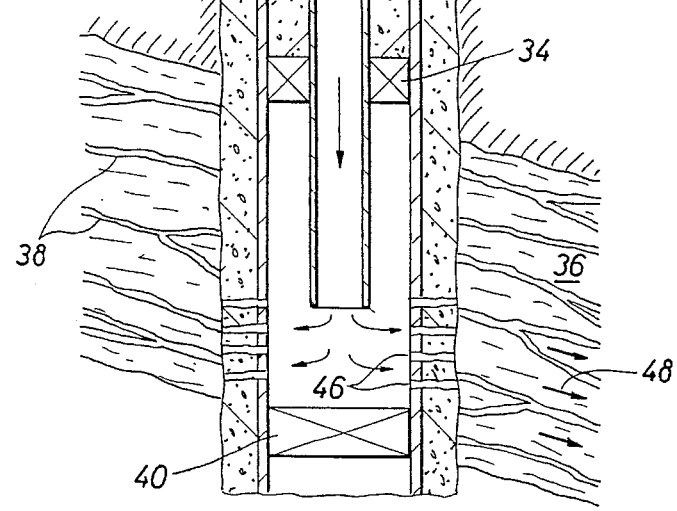

Attention is first drawn to FIG. 1 which illustrates a typical injection well. The borehole 10 extends from the surface of the earth 13 through an USDW 30, an impermeable shale zone 32 and into the injection formation 36. Slurry, depicted by the arrows 44, is injected from the surface through a tubular member 16 which is preferably production tubing. Extending from the surface 13 through the aquifer 30 are two additional strings of tubulars 14 and 12 whose longitudinal axes are essentially coincident with the axis of tubing 16. These tubulars are preferably standard steel casings used in the completion of oil and gas wells. The casing 12 terminates below the lowest vertical extent of the USDW 30 at the casing shoe 20. Cement 22 fills all tubular-borehole annuli. The USDW is, therefore, shielded from the flow of injected slurry by three strings of steel tubulars and cement. This arrangement is in compliance with current regulations for injection wells and insures an adequate vertical and radial hydraulic seal of the USDW. Tubing 16 and casing 14 extend through an impermeable shale whose vertical thickness 50 is a minimum of 250 feet to meet current injection well specifications. Through the impermeable shale and down to the packer 34, the casing-borehole annuli are filled with cement 22, again to insure hydraulic sealing to protect the aquifer from any vertical fluids migration. The borehole 10 penetrates an injection formation denoted by the numeral 36. The shale 32 serves as an impermeable barrier between the injection formation 36 and the aquifer 30. Packer 34 is positioned at the top of the injection formation. The casing 14 extends through the injection formation while the tubing 16 terminates in the vicinity of the lower boundary of the injection formation. Cement 22 fills the casing/borehole annulus in this region of the well. A cement plug 40 or other suitable bridging mechanism is positioned within the casing string 14 at the lower boundary of injection zone 36. Perforations are made in the casing 14 and the cement sheath thereby establishing fluid communication between the tubing 16 and the injection formation 36. Perforations are preferably made near the lower boundary of the injection interval. Should these perforations become blocked or clogged over time by the injection of waste slurries, new perforations can be made above the blocked perforations thereby maintaining a suitable flow path between the injection tubing and the injection formation.

Characteristics of the injection formation will next be examined. The formation is preferably high porosity with a high permeability in order to accept the injected slurries with minimal resistance. This allows low surface injection pressures which is a novel and critically important feature of the invention as discussed previously. Formations at least partially depleted of their virgin fluids if any are also desirable in that they tend to readily accept injected fluid. It is even more important that the formation dip in angle with respect to the horizontal as shown in FIG. 1. In certain instances, the injection formation might exhibit little or no dip at the point of penetration of the borehole, but dip significantly at distances radially removed from the borehole. An example would be an injection well drilled near the top of a geologic protrusion such as a salt dome. Finally, it is extremely important that a large fraction of the effective porosity of the formation be in the form of fissures or natural fractures as designated by the numeral 38. Such formations are quite commonly found on the flanks of salt domes or any other type of geological protrusion or up thrust. Cap rocks usually associated with these types of geological features provide the required impermeable barrier above the injection formation. Again, the combination of a dipping formation and a well developed system of interconnected fractures minimizes the resistance of the injection formation to the injected slurry thereby minimizing required surface injection pressures. The slurry, being weighted as mentioned previously, tends to flow primarily down dip under the influence of gravity and the hydrostatic pressure head of the slurry column. This flow is in the desired direction in that it is away from the USDW 30 located up hole. Geological studies have indicated that several reservoirs can accommodate on the order of 50 million barrels of waste slurry from a single injection well.

To summarize the function of the injection well depicted in FIG. 1, slurry is pumped from the surface of the earth 13 through tubing 16 into a region of the casing 14 isolated by the packer 34 and the cement plug 40. The injected fluid exits the borehole through perforations 46 and flows into the tilted, fractured injection formation 36. The path of flow within the injection zone occurs primarily within the fracture system 38 and the flow is down dip as illustrated by the arrows 48.

As an alternate embodiment (not shown), the injection well can be cased and cemented from the surface to the top of the injection zone. This form of open end completion is possible in highly consolidated, vertically fractured injection formations. Since the injection formation is not cased and cemented, perforations are not needed to establish hydraulic communication between the injection zone and the surface of the earth.

The functional relationships between the surface elements of the invention, the injection well and the injection formation are illustrated in FIG. 2. The waste slurry, designated by the numeral 70, enters the system at input 74. The water component of the waste can be salt water or fresh water. Waste slurry can be delivered to the disposal site by barge, boat, truck, pipeline or any other operationally and economically feasible means. Certain preprocessing steps are then performed at the block designated as 72. These preprocessing steps include the adding of the viscosifier and weighting agent, screening of particulates and other steps which have been mentioned previously and will be discussed in detail in a following section. Once preprocessing has been completed, the waste slurry exits at output 76 and enters a holding tank. At this point, the waste 70 comprises a slurry of liquid and suspended solid particulate material and has been preprocessed to meet all operational and regulatory requirements. It should also be noted that the slurry is at atmospheric pressure. The slurry is then pumped from the holding tank 70 through fitting 71 into tubing 16 within the injection well. The pressure requirements of the pump are not stringent since the slurry has been weighted and it is being pumped into a highly fractured, dipping injection formation 36. Pumps generating surface pressures of 100 psi or less have been found sufficient to maintain a reasonable disposal rate in suitable injection formations. By contrast, conventional injection requires a much higher MASIP. In some situations, the slurry requires no pumping and flows into the injection formation by means of a siphoning effect driven by the hydrostatic head of the weighted slurry column. That is, if the pump 62 is shut off and the valve 66 in pump bypass line 64 is opened, the waste 70 will flow from tank 60 into the dipping injection formation 36 as depicted by arrows 48.

Attention is now directed toward the preprocessing steps, each of which will be discussed in detail. The preprocessing steps are shown in block diagram in FIG. 3. There is some flexibility in the sequence of the steps. The sequence depicted in FIG. 3 is selected for purposes of discussion only.

In the previous discussion of non hazardous oilfield waste (NOW) and naturally occurring radioactive material (NORM), it was mentioned that essentially all earth material contains some background level of naturally occurring radioactivity which include isotopes which emit alpha and beta particles as well as gamma radiation. Generally speaking, material classified as NOW are considered "non radioactive" in the sense that their level of naturally occurring radioactivity is below a regulated level. Current regulations classify any material with equivalent radium-226 specific activity below 30 pico Curies per gram of sample in the NOW category. Current regulations also allow NOW material to be disposed in injection wells of the type described in the previous paragraphs. Any waste material received for injection disposal must be monitored to determine if it is classified as NORM or NOW material. If the waste has a radioactive level that exceeds the regulatory limit at which NOW becomes NORM, dilution may be required before disposal into some wells. This step is shown at block 80 of FIG. 3. The diluent might be liquid such as brine or other available waste from drilling or production operations. Alternately, the addition of viscosifier and weighting material might suffice to bring the waste within the NOW category if the order of the steps of FIG. 3 are rearranged. It should be noted that the 30 pico Curie level is a regulatory limit. This limit is subject to change, and injection wells with unregulated or unlimited radioactivity restrictions might be permitted.

Excessive concentrations of grease or oil are removed from the waste prior to injection for environmental and possible economic reasons. This process is shown at block 82 of FIG. 3. One method of removal is gravity separation using a commercially available gun barrel separator. If the concentration of oil in the waste is equal to or greater than 1 barrel per 2000 barrels of waste, skimming techniques are used to remove the oil constituent. It is possible that the value of the skimmed oil exceeds the cost of skimming thereby producing a byproduct of net economic value.

Although one of the novel features of the invention is the ability to inject solid particulate material along with the liquid phase of the waste, experience has shown that there are some limitations to the size of the particulates in order to achieve an efficient injection program. The waste may include relatively large particles of solid material such as "chunks" of drill bit cuttings. Although the maximum size of particle that can be injected is a function of many factors including the fracture system of the injection zone, experience has shown that particles up to 2–5 millimeters in diameter can be effectively injected in most operations. The incoming waste is screened with, as an example, a 10 mesh screen as shown generally at block 84 of FIG. 3. Particles which do not pass through the screen are diverted to a grinding or shearing system to reduce their size as illustrated at block 88. Such means might be a sand pump or other suitable grinding apparatus. The ground particles are then reintroduced to the main stream of the preprocessing operation at block 84 for a second screening. The screening operation 84 and particle reduction operation 88 are repeated until the particulate material is reduced to or below the predetermined size. It should again be noted that the 10 mesh size specification is rather arbitrary and dependent upon many factors including the fracture system of the injection reservoir. Particulates as large as sand have been successfully suspended and injected, as well as shale cuttings as large as 5 millimeters in diameter.

Figure 4:
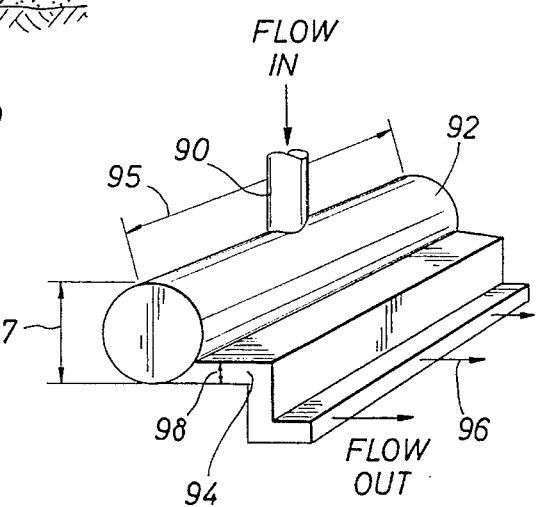
FIG. 4 illustrates a reduced feed flow manifold used in the preprocessing of the slurry prior to injection.

It is advantageous to reduce the flow pressure of the slurry during the screening operation 84. This is accomplished in the preferred embodiment of the invention by using a reduced flow feed manifold depicted in FIG. 4. Slurry flows into the manifold through input line 90 and first enters and partially fills an essentially cylindrical portion of the manifold identified by the numeral 92. For a four inch input flow line 90, the dimension identified by the arrow 97 is preferably be about ten inches and the dimension identified by the arrow 95 is approximately four feet. The effective cross section of the flow is significantly increased by the cylindrical portion 92 of the manifold thereby reducing the flow pressure. Slurry flows from the cylindrical portion of the manifold through a slightly constricting conduit 94 with a rectangular cross section. The dimension identified by the numeral 98 is approximately one inch or less. The slurry exits the reduced flow feed manifold as depicted by the arrows 96 and flows to the previously described screening operation.

Viscosifiers and possibly weighting material is added to the waste stream at block 86 of FIG. 2. A possible viscosifier is virgin bentonite which is a clay mineral with a specific gravity of approximately 2.7. Since the specific gravity of the viscosifier is relatively large, it may also serve as a weighting agent. It is desirable to bring the viscosity of the waste stream to a funnel viscosity in the range of approximately 60–90 seconds per quart for efficient operation. At this viscosity and with particulates in the ideal size range of 2 millimeters in diameter or less (10 mesh sieve), a slurry containing 15 to 35% solids can be obtained and successfully injected. Barite (barium sulfate) with a specific gravity of over 4 can be used as an independent weighting agent. The amount of material added for the sole purpose of weighting the slurry is, of course, a function of the amount of waste particulates in the slurry. It has been found that a slurry weight of 10 lbs/gal or more is beneficial for most injection operations.

A second embodiment of the invention involves the use of waste material from other NOW waste processing operations in place of virgin clays as a viscosifier and weighting material. A surface processing method for NOW material, offered commercially by the assignee of the current invention, generates a material that is very high in clay content and would be very useful as a viscosifier and a weighting agent in the present invention. That is, recycled material from one type of processing could be used in the disposal technique of the present invention thereby eliminating the need to use any virgin material. This is both environmentally and economically desirable as no additional volume of NOW is created.

In most operations, it has been found that the pH of most preprocessed slurry falls within the range of 6 to 8. If, for any reason, the preprocessed material is sufficiently corrosive to cause damage the processing or injection apparatus or even to the injection formation, the pH can be adjusted in the preprocessing steps preferably after step 86.

The preprocessed waste is output at the point indicated schematically by the numeral 76 and passed to pump 62 for injection into the injection zone.

While the methods and apparatus herein described constitute the preferred embodiment of this invention, it is to be understood that the invention is not limited to these precise methods and forms of apparatus and that changes may be made therein without departing from the scope of the invention.

What is claimed is:

1. A method for disposing solid material in a subterranean injection formation comprising:
   (a) mixing at the surface of the earth said solid material, liquid and viscosifier thereby forming a slurry;
   (b) penetrating a subterranean injection formation with a borehole;
   (c) selecting said subterranean injection formation such that:
      (i) the porosity and permeability of said subterranean injection formation is such that said slurry can be either flowed through said borehole and into said injection formation by means of the force of gravity or pumped through said borehole and into said injection formation at a low surface injection pressure, and
      (ii) said injection formation is below underground sources of drinking water; and
   (d) transferring said slurry from the surface of the earth through said borehole into said injection formation.

2. The method of claim 1 wherein said slurry is transferred from the surface of the earth through said borehole to said injection formation by pumping at a low injection pressure, wherein said injection pressure is 100 psi or less.

3. The method of claim 2 wherein said injection formation contains fractures.

4. The method of claim 3 wherein said injection formation and said fractures dip at an angle with respect to the horizon.

5. The method of claim 4 wherein a weighting material is added to said slurry.

6. The method of claim 1 wherein said viscosifier is selected to be montmorillonite or any type of native clay.

7. The method of claim 1 wherein a product from a waste processing operation is used as a viscosifier.

8. The method of claim 1 wherein said borehole is hydraulically isolated from all intervening layers of earth formation between the surface of the earth and said injection formation.

9. A method for injecting a slurry into a subterranean injection formation comprising:
   (a) pretreating said slurry at the surface of the earth,
   (b) selecting a subterranean injection formation:
      (i) which contains interconnecting fractures,
      (ii) which is dipping at an angle with respect to the horizon, and
      (iii) which is hydraulically isolated from underground sources of drinking water;
   (c) penetrating said injection formation with a borehole,
   (d) casing and cementing said borehole thereby hydraulically isolating said borehole from intervening earth strata between the surface of the earth and said injection formation; and
   (e) pumping, at a low surface injection pressure, said pretreated slurry from the surface of the earth through said borehole into said injection formation.

10. The method of claim 9 wherein said pretreating of said slurry comprises the steps of;

(a) adding a viscosifier to said slurry;

(b) reducing the size of solid particulate material in said slurry to a predetermined size or smaller; and (c) diluting said slurry if required to reduce the radioactivity level of said diluted slurry to a predetermined level.

11. The method of claim 10 comprising the additional step of adding a weighting material to said slurry.

12. The method of claim 10 comprising the additional step of removing essentially all oil and grease from said slurry.

13. The method of claim 10 wherein said viscosifier is selected to be a naturally occurring material including montmorillonite or native clay.

14. The method of claim 10 wherein said viscosifier is selected to be a man made material such as a polymer.

15. The method of claim 10 wherein said viscosifier is selected to be a byproduct material from a waste processing operation.

16. The method of claim 10 wherein said added viscosifier material also serves as diluent for said slurry and a weighting agent for said slurry.

17. The method of claim 11 wherein said weighting material is selected to be barite.

18. The method of claim 9 wherein said pump is operated to produce a surface injection pressure of 100 psi or less.

19. The method of claim 9 wherein said pump is operated at a surface injection pressure which is less than a maximum allowable surface injection pressure.

20. The method of claim 9 wherein said injection formation is selected to be a depleted mineral strata located in the vicinity of a cap rock and provides required geologic integrity for hydraulic isolation.

21. The method of claim 9 wherein said injection formation is selected to be a naturally fractured and porous formation and is dipping at an angle with respect to the horizon at the point of intersection with said borehole.

22. The method of claim 10 wherein said predetermined level of radioactivity is selected to be the maximum level that defines non hazardous oilfield waste.

23. The method of claim 10 wherein said predetermined level of radioactivity is selected to be 30 pico Curies per gram of slurry.

24. The method of claim 10 wherein said predetermined solid particle size is selected to be the maximum size of solid particle that will pass through said interconnecting fractures of said subterranean injection formation.

25. The method of claim 10 wherein said predetermined size of said particulate material is selected to be 5 millimeters or less.

26. Apparatus for disposing solid material in a subterranean injection formation comprising:

(a) a mixer for mixing at the surface of the earth said solid material, liquid and viscosifier thereby forming a slurry;

(b) means for pretreating said slurry;

(c) a borehole penetrating said injection formation, wherein:

(i) said injection formation is such that said slurry can be either flowed into said injection formation by means of the force of gravity or pumped into said injection formation at a low surface injection pressure, (ii) said injection formation is below any underground sources of drinking water penetrated by said borehole, (iii) said borehole is cased and cemented thereby hydraulically isolating said borehole from intervening earth strata between the surface of the earth and said injection formation, and (iv) said casing and cement contains perforations within said injection formation thereby establishing hydraulic communication between the surface of the earth and said injection formation; and (d) a pump to transfer said pretreated slurry down said borehole and through said perforations and into said injection formation.

27. The apparatus of claim 26 further comprising casing and cement within said borehole extending from the surface of the earth through said injection formation wherein perforations in said borehole casing and cement within said injection formation establish hydraulic communication between the surface of the earth and said injection formation.

28. The apparatus of claim 26 wherein said means for pretreating slurry comprises:

(a) a monitor for monitoring the radioactivity level of said slurry;

(b) a screening device for separating large solid particulate material;

(c) grinding means for reducing the size of said large solid particulate material captured by said screening means;

(d) means for removing grease, oil and paraffin from said slurry; and (e) a mixer for mixing non radioactive diluents and weighting material with said slurry in amounts such that said monitored radioactivity level of said slurry is below a predetermined level.

29. The apparatus of claim 28 wherein said grinding means comprises a sand pump.

30. The apparatus of claim 28 wherein said means for removing grease, oil, and paraffin comprises a gun barrel separator or a heat treater.

31. The apparatus of claim 28 wherein said means for removing grease and oil comprises a skimmer.

32. The apparatus of claim 28 wherein said means for removing grease, oil and paraffin comprises biodegratative agents.

33. The apparatus of claim 26 further comprising means for discontinuing the operation of said pump and allowing said slurry to flow into said injection formation as a result of the hydrostatic head of the slurry column within said borehole.

34. The apparatus of claim 28 further comprising a reduced flow feed manifold to reduce flow pressure of said slurry prior to passing through said screening means.

35. The method of claim 10 further comprising the step of reducing the flow pressure of said slurry in conjunction with the step of reducing the size of solid particulate.

* * * * *